INVENTORS: C. W. KECKLER
A. E. HAGUE
BY P. C. Smith
ATTORNEY

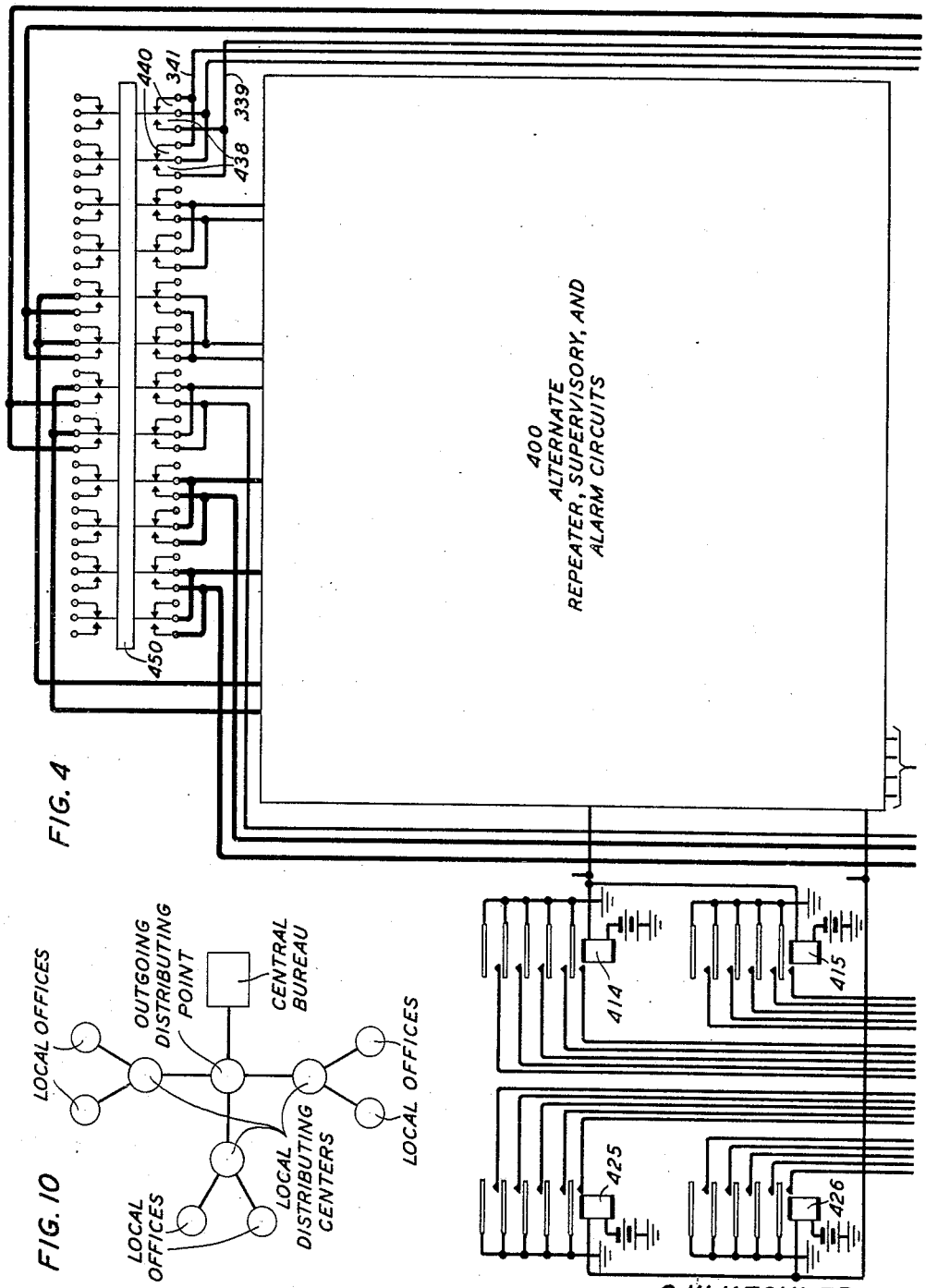

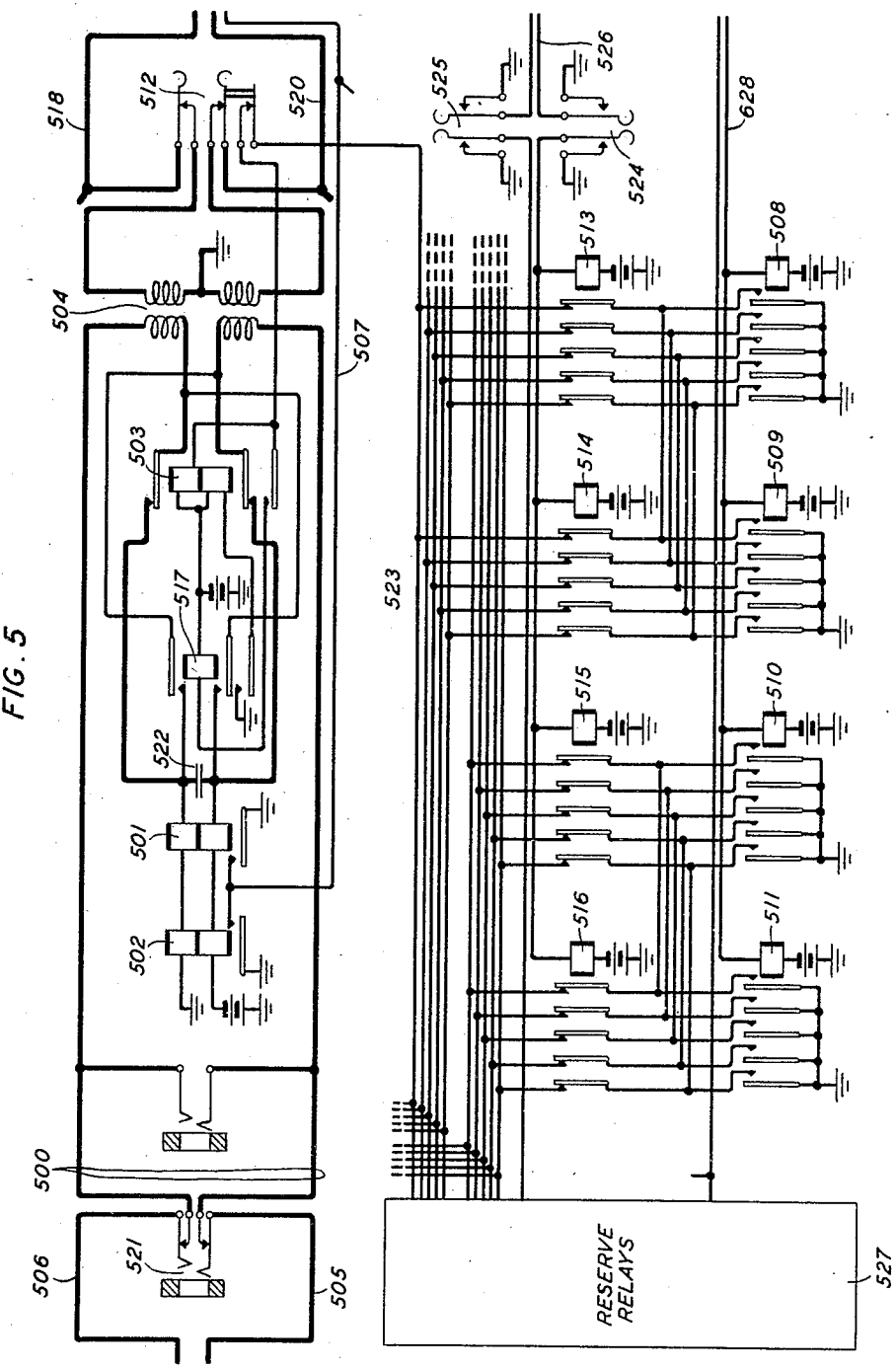

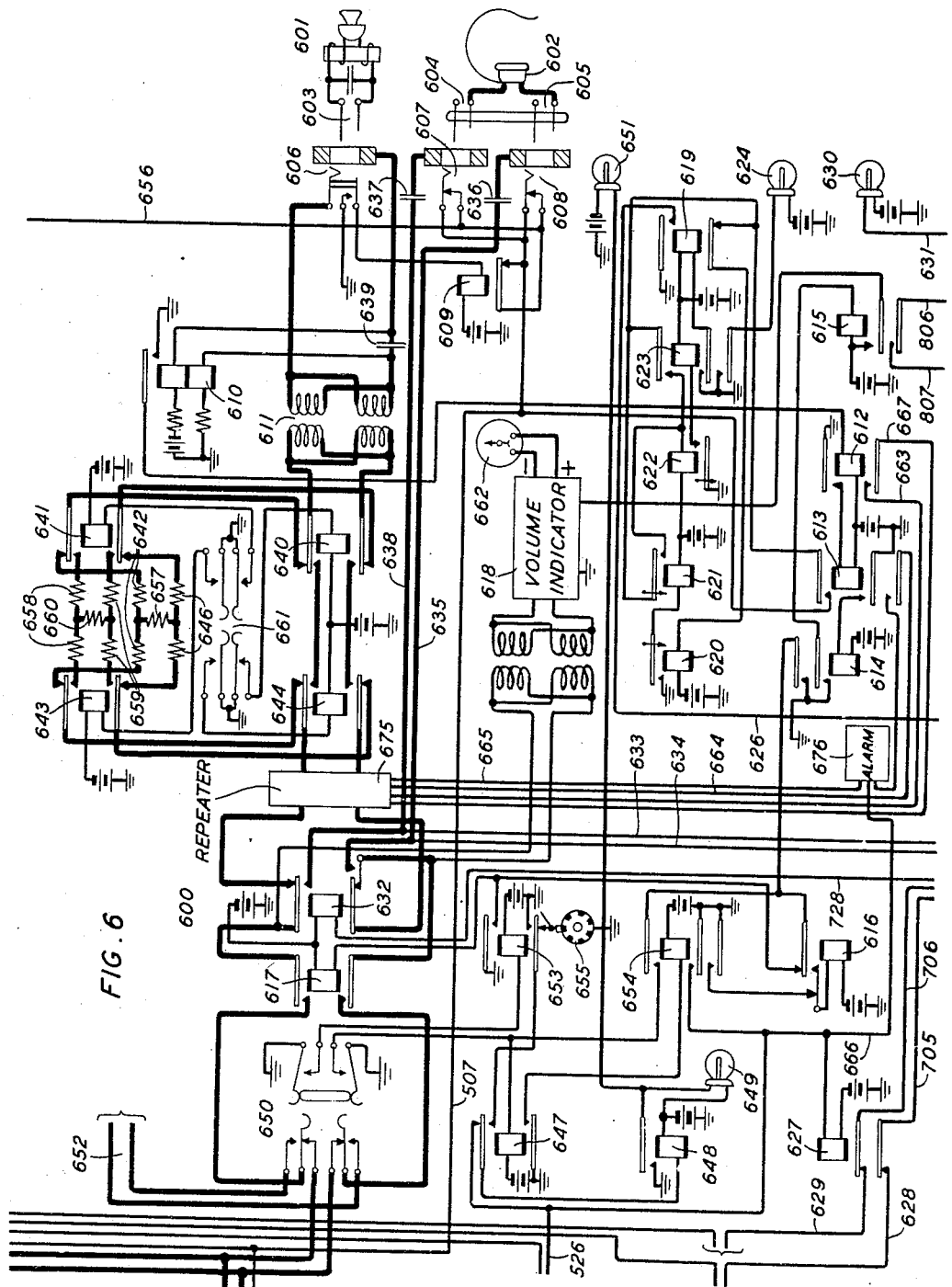

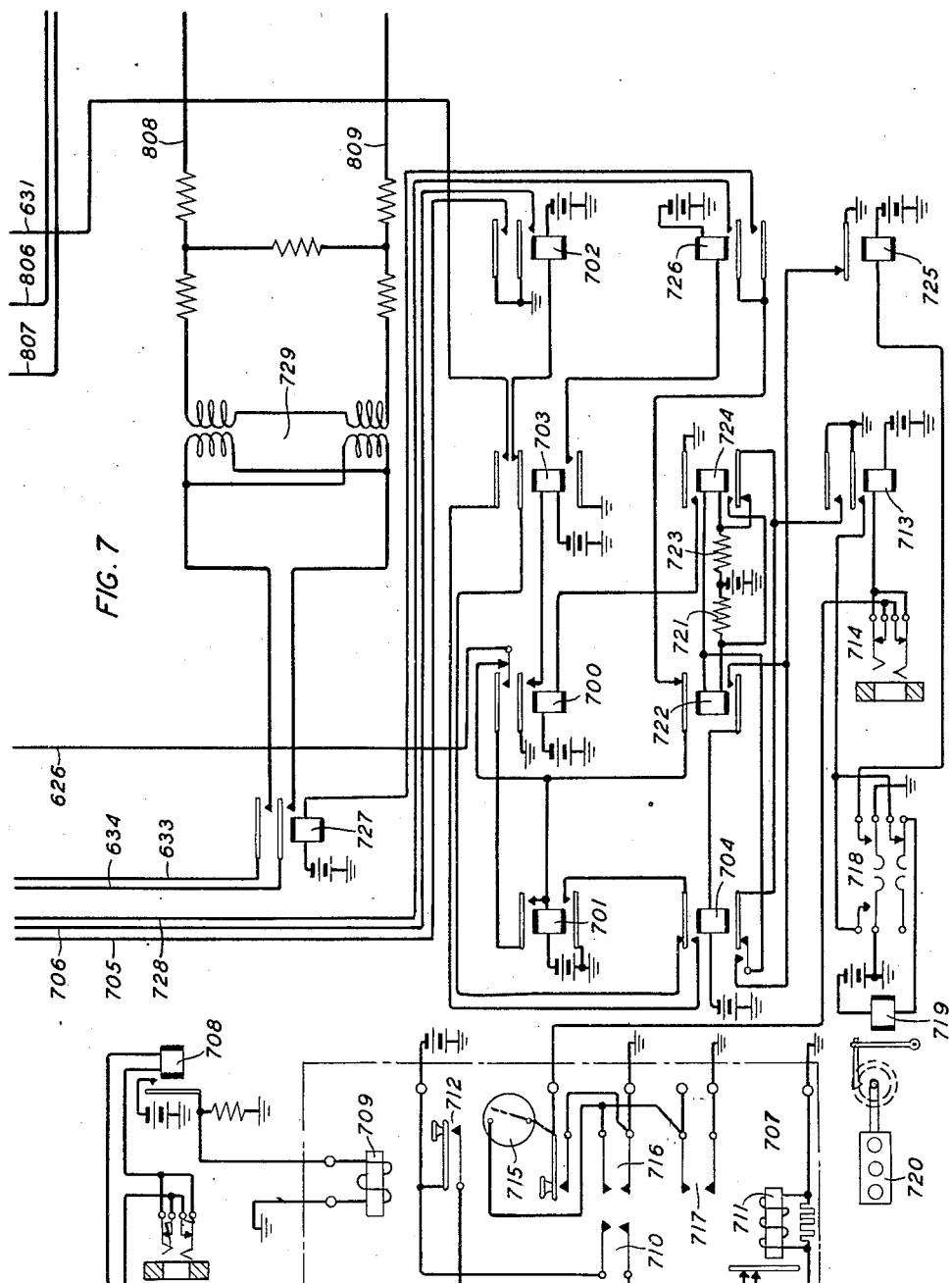

June 14, 1932.  C. W. KECKLER ET AL  1,863,137
TIME OF DAY ANNOUNCING SYSTEM
Filed Jan. 12, 1931   9 Sheets-Sheet 8
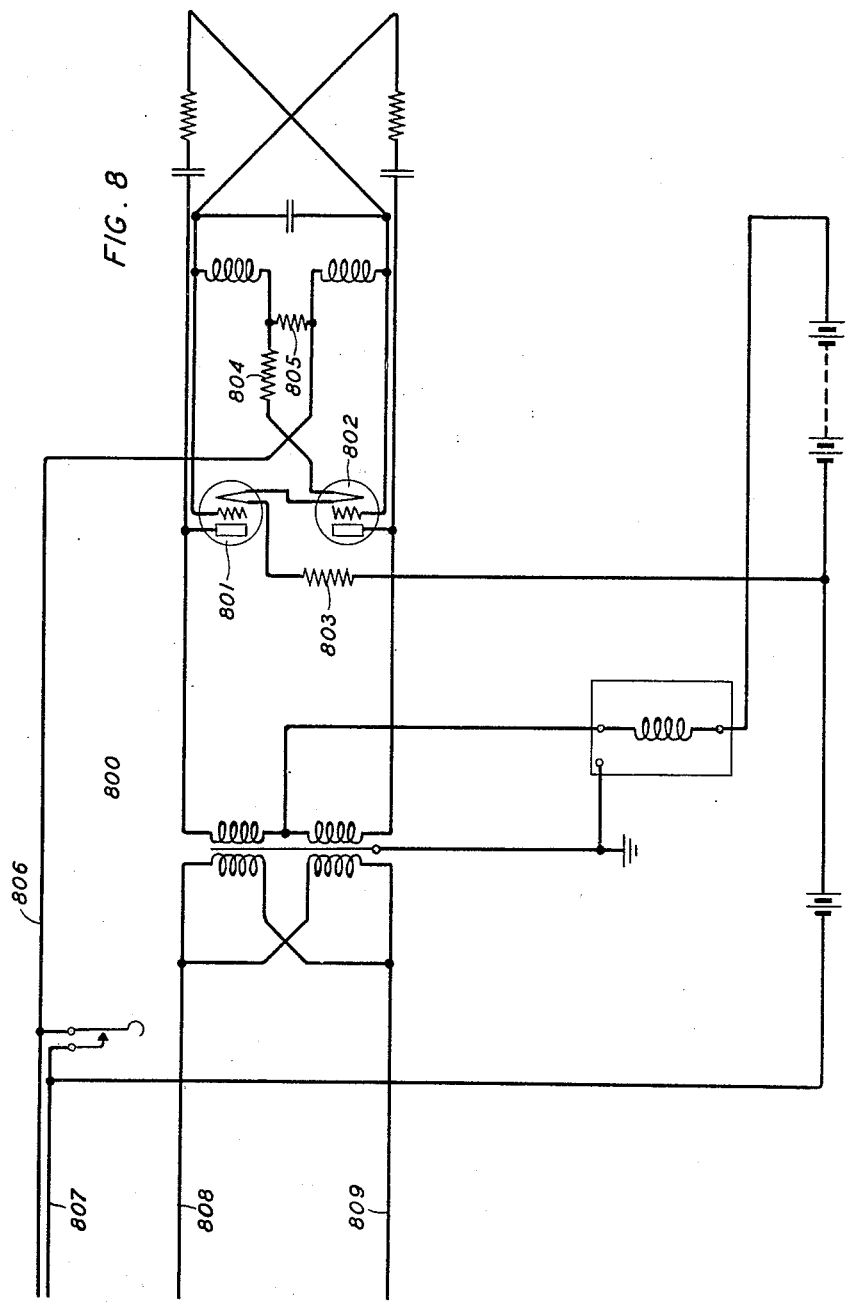
INVENTORS: C.W.KECKLER
A.E.HAGUE
BY P.C.Smith
ATTORNEY

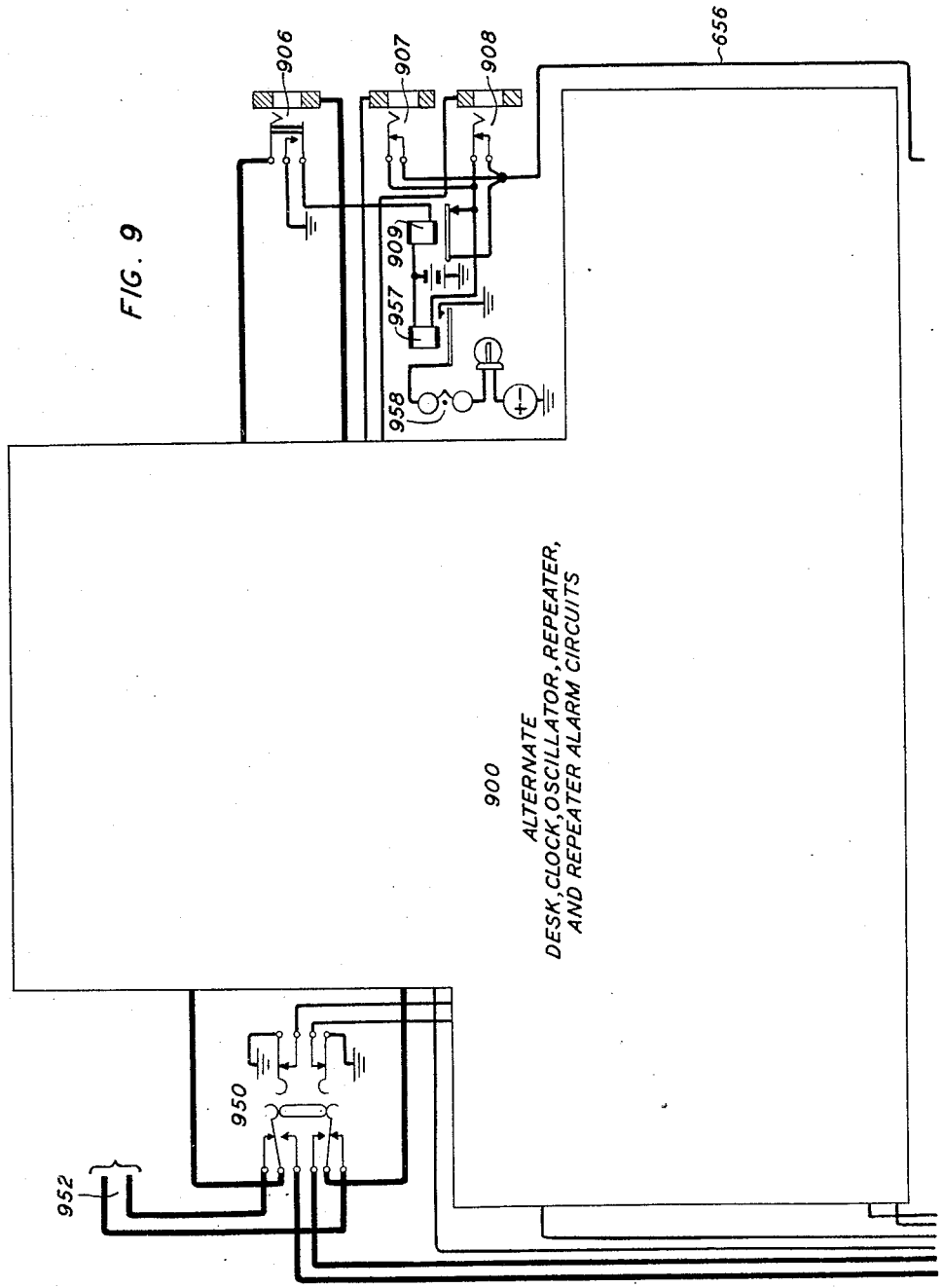

Patented June 14, 1932

1,863,137

UNITED STATES PATENT OFFICE

CHARLES W. KECKLER, OF SUMMIT, AND ALFRED E. HAGUE, OF WEST ORANGE, NEW JERSEY, ASSIGNORS TO BELL TELEPHONE LABORATORIES, INCORPORATED, OF NEW YORK, N. Y., A CORPORATION OF NEW YORK

TIME OF DAY ANNOUNCING SYSTEM

Application filed January 12, 1931. Serial No. 508,211.

This invention relates to telephone exchange systems and more particularly to systems in which a subscriber by calling a particular line designation either by dialing as in machine switching systems, or by the aid of an operator as in manual systems, may obtain a connection with a central time announcing bureau from which at specified intervals announcements are made of the correct time of day. The object of the invention is to enable time of day announcements to be broadcast efficiently to as many subscribers in an exchange area or a plurality of exchange areas, as requests the time of day at any period thereof.

Heretofore it has been proposed to provide a time announcing mechanism for an office in which a plurality of subscribers' lines terminate which may be automatically selected by any calling subscriber of the office through the dialing of a line designation set aside for that purpose. Upon the seizure of the announcing mechanism from one or a plurality of subscribers' lines, the mechanism through phonographic means, for example, as is disclosed in Patent No. 1,227,523, granted to J. G. Blessing on March 22, 1917, or through photographic sound producing means, for example as shown in Patent No. 1,618,242, granted to G. K. Thompson on February 22, 1927, transmits automatically to the subscriber's line the hour and minute of the time of day.

It has also been proposed to provide a special operator's position in the exchange area which may be called either automatically or manually in the same manner as a local call would be made to another subscriber's line, the operator upon answering the call announcing to the calling subscriber the exact time of day.

Such systems when applied to a large exchange area require a plurality of time announcing bureaus to give adequate service and do not permit the centralization of the service in a single operator's position for enabling one operator to announce the time on all calls incoming from an extended area. In accordance with the present invention, one embodiment of which has been disclosed by way of example, a single time announcing bureau employing but a single operator may be reached from offices of exchanges within a large area. For example, a time announcing bureau located in New York city might be employed for serving all of the exchange areas surrounding New York city within a radius of 300 miles, the distant exchange areas being connected to the time bureau over long distance trunk lines set aside for that purpose. Thus, when any subscriber in such an area desires the correct time it is only necessary for him to call a designated number, for example, Meridian 4000, whereupon if his line terminates in a manual exchange the operator will connect his line with a trunk extending through a local center to the time announcing bureau, or if his line terminates in a dial switching office, he will upon dialing the designated number become connected by automatic selector switches with a trunk extending to the time bureau through a distributing center.

By suitably fanning out the trunk line terminating in the time announcing bureau through intermediate and local distribution centers it is possible to enable the operator at the bureau to simultaneously announce the time to any number of subscribers in an extended area whom may at any moment be connected to the bureau for the purpose of receiving such time announcement.

In general the system in accordance with the present invention functions as follows: It will be assumed, for example, that a subscriber whose line terminates in a dial switching office in Philadelphia desires the correct time and dials the designated number, Meridian 4000. In response to dialing, selector switches in the local office at the Philadelphia exchange will establish a connection with a trunk terminating in a distribution center local to the Philadelphia area and multipled with other trunks extending to other offices at the Philadelphia exchange and with other trunks extending to other exchanges in nearby communities to a trunk extending to an outgoing distributing point located, for example, in New York city. This trunk at the Philadelphia distributing center would be provided with a one-way vacuum tube repeater for amplifying voice currents incoming thereto from the distributing point in New York city. Also incoming to the distributing point in New York city and multipled to the trunk extending to Philadelphia, other trunks would be provided extending to local distributing centers located, for example, at Newark, New Jersey; Easton, Pennsylvania; etc. From this outgoing distributing point the multipled trunk would extend as a single trunk to the central bureau in New York city, also equipped with a repeater. Thus, the Philadelphia subscriber by dialing the designated number becomes connected over the trunk network directly with the central bureau. At the same time many other subscribers located in the areas surrounding the local distribution centers in Philadelphia, Newark, Easton, etc. may be in direct connection with the central time bureau in New York city. Also from the outgoing distributing circuit in New York city other trunk networks may extend northward through local distributing centers for serving northern New York and eastward for serving New England. Indeed it is conceivable that with a single central time bureau located at some central point along the eastern seaboard, the entire eastern time zone might be served.

It is of course obvious that the system according to the present invention might be used to give service locally to a large metropolitan area such as New York city. In that case the offices of the area would be grouped according to their location in the area into sections, each section being served by a local distributing center, the local centers being connected by trunks extending to an outgoing distributing point associated with the central bureau located at some central position in the area.

At the time bureau whenever a call, or any number of simultaneous calls are incoming over the trunk line terminating therein, a calling lamp signal is given to the operator to advise her of that fact and a circuit is established which is effective, in combination with a clock circuit associated with the operator's desk, during a 7½ second interval prior to the next time announcement period to cut through the circuits extending from the calling lines that may be at the time connected to the central bureau preparatory to transmitting the announcement. The clock circuit is arranged to indicate the hours, minutes and quarter minutes and just prior to the next quarter minute period following the receipt of an incoming call the operator is signaled to announce the time indicated by the clock. She then announces the time, for example, by saying, "When you hear the tone signal it will be exactly 5 and ¾ minutes after 5 o'clock". When this exact time is reached the clock circuit extinguishes the signal and transmits a tone signal to subscribers' lines which are connected to the central bureau. In this manner the operator announces the time at one-quarter minute intervals as long as the calling lamp at her position remains lighted.

In accordance with the present invention, provision is made whereby the cutting-through of a one-way voice transmission circuit from the central time bureau to a local office trunk line seized at the local office in which a calling line terminates, is not effected at the local office trunk line until the clock circuit at the central bureau indicates a silent interval just preceding an announcement period. By thus synchronizing the cutting-through of a transmission circuit with the clock circuit of the operator's desk, the receipt of partial time announcements by calling subscribers is obviated.

In the establishment of connections from a dial switching office employing panel type apparatus it has been found desirable to establish connections with trunk circuits outgoing to the central time announcing bureau in the same general manner as connections are established to manual offices, that is, by setting up a class of call condition in the subscriber's central office sender of such a character as will cause the sender to position a district selector and an office selector, if required, to select an outgoing trunk and to then transmit codes of impulses to the trunk. By thus assigning the same class designation to calls for the time bureau as are assigned for calls to manual offices, the necessity for a special setting of the class switch of the sender is obviated. Since, however, the numerical portion of the time bureau designation, in the example assumed the designation 4000, is not employed, it becomes necessary to absorb the code impulses corresponding to this designation transmitted by the sender to the trunk circuit. Provision is therefore made, in accordance with the present invention, in the trunk circuit for absorbing these impulses and signaling the sender following the receipt of the last impulse so that the sender which is then no longer required may be dismissed. In accordance with the present invention, this signal may be sent to the sender upon the receipt either of a final heavy positive impulse of current if the sender employed is arranged to terminate the code impulsing by the transmission of such a heavy positive impulse, or after such an interval following the receipt of the last negative impulse of the code impulses as would indicate that the sender has completed the transmission of code impulses.

Other features disclosed and described herein have been made the basis of other co-pending applications filed concurrently herewith. These applications are the application of R. F. Massonneau, Serial No. 508,209, the application of W. B. Prince, Serial No. 508,208, and the application of H. G. W. Brown, Serial No. 508,207.

A clearer conception of the scope and purpose of the invention will be obtained from a consideration of the following description taken in connection with the attached drawings in which:

Fig. 1 shows the line of a subscriber A terminating in an originating office X of an exchange area, the schematic representation of a line finder, link circuit having a line finder selector and sender selector by means of which the line may become associated with a central office register sender, such portions of a register sender shown in the lower portion of Fig. 1 as are necessary to an understanding of the invention, and the schematic representation of a district selector and office selector by means of which the line may be further extended;

Fig. 2 shows an outgoing trunk extending to a local distributing center, Fig. 3;

Figs. 3 and 4 taken together, show apparatus at a local distribuitng center, Fig. 3 showing an extension of the trunk of Fig. 2 extending over a two wire trunk to the outgoing distributing point of Fig. 5, and at the left portion of the figure the supervisory circuits of other trunks similar to the trunks of Fig. 2 which are also multipled to the trunks of Fig. 3 and Fig. 4 showing schematically alternate repeater, supervisory and alarm circuits which may be used in place of similar circuits shown in Fig. 3;

Fig. 5 shows the other end of the trunk extending to the local distributing center of Figs. 3 and 4 and apparatus of an outgoing distributing circuit;

Figs. 6 to 9 inclusive taken together show apparatus at a central time announcing bureau. Fig. 6 shows one desk circuit at the central bureau; Fig. 7 shows the clock circuit and Fig. 8 shows an oscillator circuit, the circuits of Figs. 7 and 8 being individual to the desk circuit of Fig. 6. Fig. 9 shows schematically an alternate desk and associated circuits which may be used in place of the similar circuits of Figs. 6 to 8 inclusive;

Fig. 10 is a diagram showing schematically the arrangement of trunking facilities for connecting a plurality of offices through local distributing centers and an outgoing distributing point with a central time announcing bureau;

Fig. 11 is a diagram showing how Figs. 1 to 9 inclusive should be assembled to disclose the detailed circuits of the invention.

*General description of the invention*

By referring to Fig. 10 a general comprehension of the scope and purpose of the invention may be obtained. As previously stated, the time of day announcing system in accordance with the present invention contemplates the establishment of a central bureau at which is positioned a special operator who, when demand arises, periodically announces the exact time within the nearest quarter minute. Obviously, if required, such operator could be provided with facilities for announcing the time within closer limits, as for example, to the nearest tenth of a minute. It is intended that the central bureau shall be accessible from a plurality of offices of an exchange area over a special trunk network fanned out from such bureau. To facilitate the interconnection of subscribers whose lines terminate in exchange offices of an area to be served by the central bureau with the central bureau the exchanges or offices of the area are divided into sections, all offices of a particular section having access to a local distributing center. From the local distributing centers of a plurality of sections, trunks extend as schematically disclosed in Fig. 10 to an outgoing distributing point located contiguous to the central bureau at which bureau the trunks incoming to the outgoing distributing point are connected to the desk circuit at the central bureau.

While the invention has been disclosed as applied to a system in which all sections of the area may be served directly from the outgoing distributing point, it will be obvious that intermediate distributing centers may be interposed between the local distributing centers and the outgoing distributing point as disclosed in detail in the copending application of R. F. Massonneau, hereinbefore referred to. Intermediate distributing centers would probably be employed in a commercial installation but have not been disclosed herein in order to simplify the disclosure as much as possible.

Figure 1:
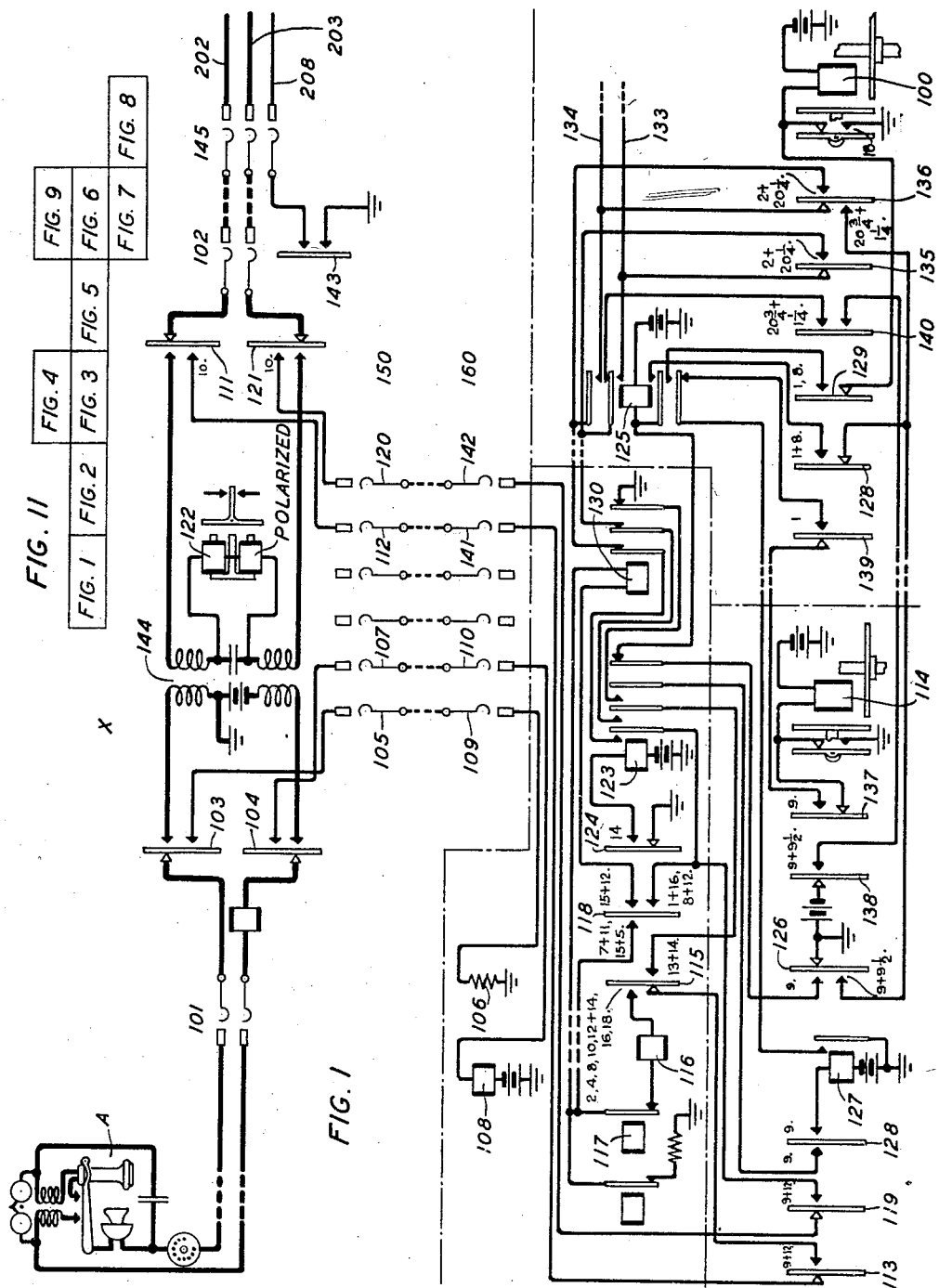

The apparatus of the originating office shown in Fig. 1 is of the well known panel type. The line finder 101, selector switches 102 and 145 and the link circuit of Fig. 1 may be of the same type and function in the same manner as the similar apparatus disclosed and described in Patent No. 1,690,206 issued to A. Raynsford on November 6, 1928. The sender may be of the same type as disclosed in Patent No. 1,505,171 issued to F. A. Stearn August 19, 1924. Only such portions of these switches, link circuit and sender have been disclosed herein as are considered necessary to an understanding of the invention, reference being made herein to the above identified patents for a full detailed disclosure.

Figure 3:
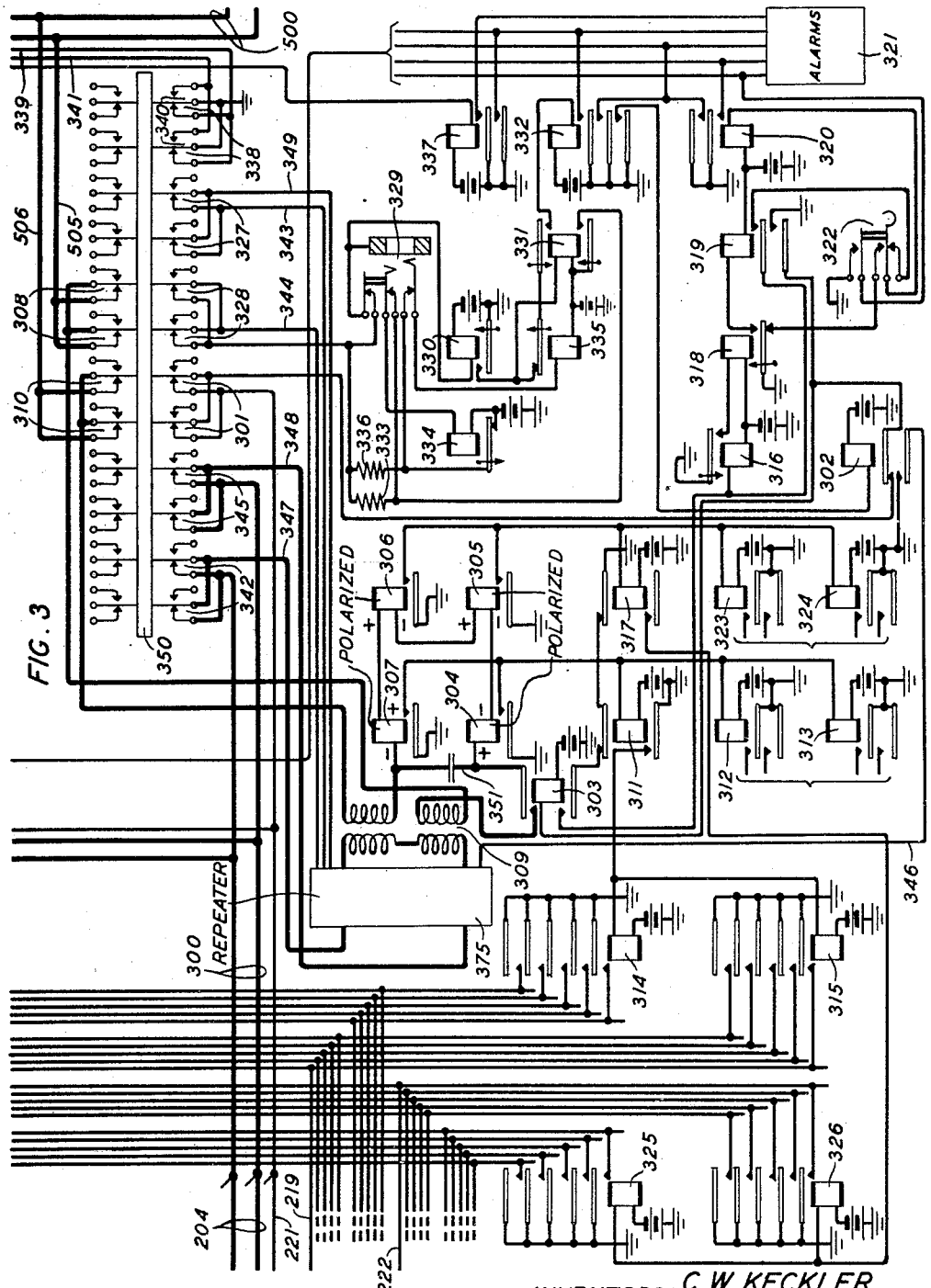

The repeaters 375 and 675 shown diagrammatically by the rectangles in Figs. 3 and 6 may be of the same type as disclosed in detail in Figs. 3 and 12 of the application of R. F. Massonneau above referred to. The repeater alarm circuit indicated by the small rectangle 676 in the lower central portion of Fig. 6 may likewise be the same as the repeater alarm circuit shown in the Massonneau application.

In Fig. 3 the trunks outgoing from bank terminals of selectors such as 145 of the dial switching office X are shown multipled together and connected at the local distributing center in the section of the area in which the office X is located, to a trunk 300 in which either the repeater 375 or the repeater 400 may be inserted by the operation of either switch 350 or switch 450. Other offices similar to office X may also have outgoing trunks terminating in the local distributing center and multipled to trunk 300. The repeaters 375 and 400 are arranged to transmit voice currents in one direction only, that is, from the central bureau towards the calling line in offices such as X. From the input side of repeaters 375 and 400 a trunk 500 extends to the outgoing distributing point Fig. 5. This trunk is also multipled as indicated at the right of Fig. 5 to similar trunks which extend to other local distributing centers such as is shown in Figs. 3 and 4, and the extension of these trunks extends to the central bureau desk circuit 600 through contacts of key 650. An alternate desk circuit 900 may be connected to the extended trunk circuit in place of desk circuit 600 by the operation of key 950 to the right and the operation of key 650 to the left. Whenever a desk circuit is removed from service by the maintenance man through the operation of the associated key 650 or 950 it becomes connected to test line 652 on line 952 extending to the maintenance man's test position. An operator's transmitter 601 and receiver 602 may be connected to either desk circuit by plug and jack connections.

Initiation of a call

With this general outline in mind the invention will now be considered in more detail. Assume that a subscriber A whose line terminates in office X initiates a call to obtain the correct time. The subscriber A upon removing his receiver from the switchhook causes the setting of the brushes of the line finder 101 upon the terminals of the calling line and the extension of circuits from the calling line and district selector 102 over wipers of the link circuit line finder selector 150 and sender selector 160 to an idle sender. It will be further assumed that the sender shown in the lower portion of Fig. 1 is idle and becomes associated with the calling line, whereupon a pulsing circuit is established from battery through the pulsing relay 108, wiper 110, wiper 107, the upper right contact of cam 104, the lower brush of line finder 101 over the subscriber's line loop returning over the upper brush of line finder 101, the lower contact of cam 103, wiper 105, wiper 109 to ground through the balancing coil 106. As soon as this pulsing circuit is established the calling subscriber receives the usual dial tone and proceeds to dial the digits of the central time bureau designation which, it will be assumed, is MER-4000 thereby setting the registers of the sender to record the office and line designations of the central time bureau number.

As soon as the idle sender becomes associated with the district selector, the sequence switch associated with the district selector 102 advances to position 3 establishing the usual fundamental circuit from the control relay (not shown) at the district selector 102 through the winding of the sender stepping relay 116. Under the control of the office code registers of the sender, the district selector 102 is controlled in the well known manner to select a trunk group extending to office selectors. Following the selection of the proper trunk group, the district selector 102 functions to select an idle office selector in the group such as the one indicated at 145. As soon as the district selector terminates its trunk hunting operation the sequence switch associated therewith advances in the well known manner to position 10 whereby a fundamental circuit is established over the conductors of the selected trunk for controlling the office selector 145.

This fundamental circuit may be traced from battery through the winding of the control relay (not shown) of the office selector 145, upper brush of switch 102, lower contact of cam 111, wiper 112, wiper 141, contacts of cam 113 of the sender control sequence switch 114, upper contact of cam 115, winding of sender stepping relay 116, back contact of the O' counting relay 117, upper left and lower contacts of cam 118 associated with the office sender sequence switch (not shown), contact of cam 119, wiper 142, wiper 120, upper contact of cam 121, lower brush of selector switch 102, to ground at the office selector.

Stepping relay 116 of the sender and the control relay of the office selector 145 operate in this circuit, the office selector being controlled in the well known manner from the sender in its brush and group selection movements to select an idle trunk such as 204 extending to the local distributing center. For calls to the central time bureau the office code registered in the sender sets up a class of call condition in the sender in the same manner as would be the case if a call were to be made to a manual office having call indicator equipment and consequently, a circuit becomes closed for relay 125 associated with the call indicator impulser 100 at the sender. This circuit may be traced from battery through the winding of relay 125, outer back contact of relay 123, to ground at the upper contact of cam 126 of the control sequence switch 114. Relay 125 upon energizing locks over its inner lower front contacts, the contacts of cam 128 to ground at the lower contact of cam 126, remaining locked until the impulser switch 100 leaves position 8.

Following the seizure of trunk 204, a control circuit is established from the sender to the control relay 205 of trunk 204 which may be traced from battery through the upper winding of relay 205, upper back contact of relay 207, tip conductor 202 of trunk 204, tip brushes of switches 145 and 102, lower contact of cam 111, wipers 112 and 141, contacts of cam 113, upper contact of cam 115, winding of sender stepping relay 116, winding of relay 130, right contacts of cam 118, contacts of cam 119, wipers 142 and 120, upper contact of cam 121, ring brushes of switches 102 and 145, ring conductor 203 of trunk 204, inner upper back contact of relay 207 to ground through the lower winding of relay 205. Relays 130 and 205 energize in this circuit. Upon the energization of relay 130 the sender sequence switch is advanced out of position 12, in which it is standing following the completion of office group selection, into position 14 in the manner fully set forth in the patent to F. A. Stearn hereinbefore referred to. In position 14, an obvious circuit is established for relay 123 over the contacts of cam 124 whereupon the initial energizing circuit of relay 125 is opened. Since the sender is disclosed in Fig. 1 as arranged to transmit a final heavy positive impulse following the completion of the sending of code impulses in accordance with the line designation registered, Fig. 2B will be connected to Fig. 2 by connecting the conductors extending downwardly from Fig. 2 to the line B—B with the conductors extending upwardly from Fig. 2B to the line B'—B', the conductors extending below the line B—B in Fig. 2 being omitted and Fig. 2A not being connected.

Relay 205 upon operating connects ground from cam 143 in the office selector 145 over the sleeve brush of selector 145, sleeve conductor 208 of trunk 204, upper back contact of relay 209, front contact of relay 205, to the middle spring of interrupter 210. As soon as interrupter 210 makes its right contact the ground on conductor 208 is extended through the winding of sleeve relay 211 which operates and locks directly to sleeve conductor 208, connects ground at its inner lower front contact to the start conductor 221, and establishes a circuit for the peg count register over its lowermost front contact, the lower back contact of relay 207, the inner lower normal contacts of relay 212 to ground at the next to lower front contact of relay 211. After an interval sufficient to permit the sender to make the usual trunk guard test and to permit the operation of the peg count register, interrupter 210 closes its left contact establishing a circuit for relay 207 from battery through the upper winding of relay 207, the lower back contact of relay 206, the upper front contact of relay 211, left contact of interrupter 210, to ground on conductor 208. Relay 207 upon operating locks over its upper winding, the lower back contact of relay 206, the lower front contact of relay 207, to ground at the next to inner lower front contact of relay 211, opens the circuit of the peg count register, disconnects the windings of relay 205 from the tip and ring conductors of trunk 204 and connects these conductors in a dry bridge including the winding of polarized relay 213. This circuit may be traced from the tip conductor 202 of trunk 204, upper front contact of relay 207, upper back contact of relay 214, upper back contact of relay 212, winding of polarized relay 213 in parallel with resistance 215, inner upper back contact of relay 212, inner upper back contact of relay 214, inner upper front contact of relay 207, to ring conductor 203 of trunk 204.

Relay 205 releases without affecting the circuits now established and relay 130 at the sender also releases thereby completing a circuit over its outer right back contact through the next to outer front contact of relay 123, contacts of cam 128 to battery through the winding of relay 127. Relay 127 thereupon energizes closing a circuit from ground over its contacts, the lowermost front contact of relay 125, contacts of cam 129 to battery through the magnet winding of the impulser switch 100 for advancing the impulser switch out of postion 1, through position 8. As soon as the switch 100 leaves position 8, the locking circuit of relay 125 is opened so that when the switch 100 rotates around into position 1 it finds no operating circuit and is arrested after completing a single revolution. As it passes through a complete revolution, switch 100 transmits a plurality of series of code impulses to the trunk circuit of Fig. 2 in the well known manner, a series being transmitted for each digit of the central bureau designation 4000.

With relay 123 energized and relay 130 deenergized, the circuit over which the code impulses are transmitted may be traced in part from conductor 133, inner upper front contact of relay 125, or the contacts of cam 135, middle left back contact of relay 130, next to inner front contact of relay 123, lower contact of cam 115, contacts of cam 113, wipers 141 and 112, thence as previously traced through the winding of polarized relay 213 of trunk circuit 204, returning over wipers 120 and 142, contacts of cam 119, inner front contacts of relay 123, inner back contact of relay 130, upper front contact of relay 125, or upper contacts of cam 136 to conductor 134. The impulses of each series may consist in the usual manner of light positive and light or heavy negative impulses. Since all of the positive impulses are light, the polarized relay 213 which is included in the impulsing circuit does not respond.

At the sender, upon the completion of the transmission of the code impulses and the return of switch 100 to position 1, a circuit is closed for control sequence switch 114 for advancing it out of position 9, the circuit extending over the contacts of cam 137, contacts of cam 139, lowermost back contact of relay 125, to ground at the front contact of relay 127. As switch 114 advances from position 9 through position 9½, a circuit is closed for transmitting a heavy positive impulse over the impulsing circuit previously traced through the winding of polarized relay 213. At the sender this current flows from battery over contacts of cam 138, contacts of cam 140, inner upper back contact of relay 125, thence over the circuit traced through the winding of relay 213, returning over the upper right and lower left contacts of cam 136 to ground over the lower contact of cam 126. Relay 213 now operates and closes an obvious circuit for relay 209, relay 209 locking in series with relay 214 over a circuit extending from battery through the windings of relays 209 and 214, inner front contact of relay 209, inner lower normal contacts of relay 212 to ground at the next to lower front contact of relay 211. Relay 214 does not operate however in this locking circuit being shunted by ground at the front contact of relay 213. As soon as the heavy positive impulse ceases when control sequence switch 114 advances beyond position 9½, polarized relay 213 releases whereupon relay 214 operates. The sender is advanced to the talking selection position following the transmission of the heavy positive impulse in turn advancing the district selector sequence switch to the talking position and itself becoming disconnected from the established connection and restored to normal condition.

Relay 214 upon operating disconnects the winding of relay 213 from the conductors of trunk 204 and establishes a circuit extending from battery through the lower winding of relay 205, upper front contact of relay 214, upper front contact of relay 207, conductor 202, tip brushes of switches 145 and 102, upper contacts of cam 111, winding of polarized supervisory relay 122, lower contacts of cam 121, ring brushes of switches 102 and 145, conductor 203, inner upper front contact of relay 207, inner upper front contact of relay 214 to ground through the upper winding of relay 205. Relay 205 operates over this circuit but current flowing through the windings of polarized relay 122 is not in such a direction as will operate relay 122.

Relay 205 upon operating establishes a circuit for relay 220, extending from battery through the winding of relay 220, upper front contact of relay 209, front contact of relay 205, conductor 201 to ground at a front contact of relay 211.

Relay 220 upon operating locks over its inner lower front contacts, inner lower front contacts of relay 207, to ground on conductor 201 and connects ringing tone from the source of ringing current 224 over the inner upper front contact of relay 220, inner upper back contact of relay 206, trunk conductor 203, ring brushes of switches 145 and 102, lower contact of cam 121, right windings of repeating coil 144, upper contacts of cam 111, brushes of switches 102 and 145, trunk conductor 202, upper back contact of relay 206, to ground at the uppermost front contact of relay 220. Ringing tone current is thereupon induced over the calling line loop through the left windings of repeating coil 144 in an obvious manner, as a signal to the calling subscriber that a connection has become extended from his line to the transmission network. Relay 220 at its contacts 223 also extends conductor 219 to the winding of pick-up relay 212 and extends conductor 222 over its lower front contacts through the lower winding of relay 207 and the upper winding of cut-through relay 206. The circuits over conductors 219 and 222 are closed in a manner hereinafter described.

Figure 2:
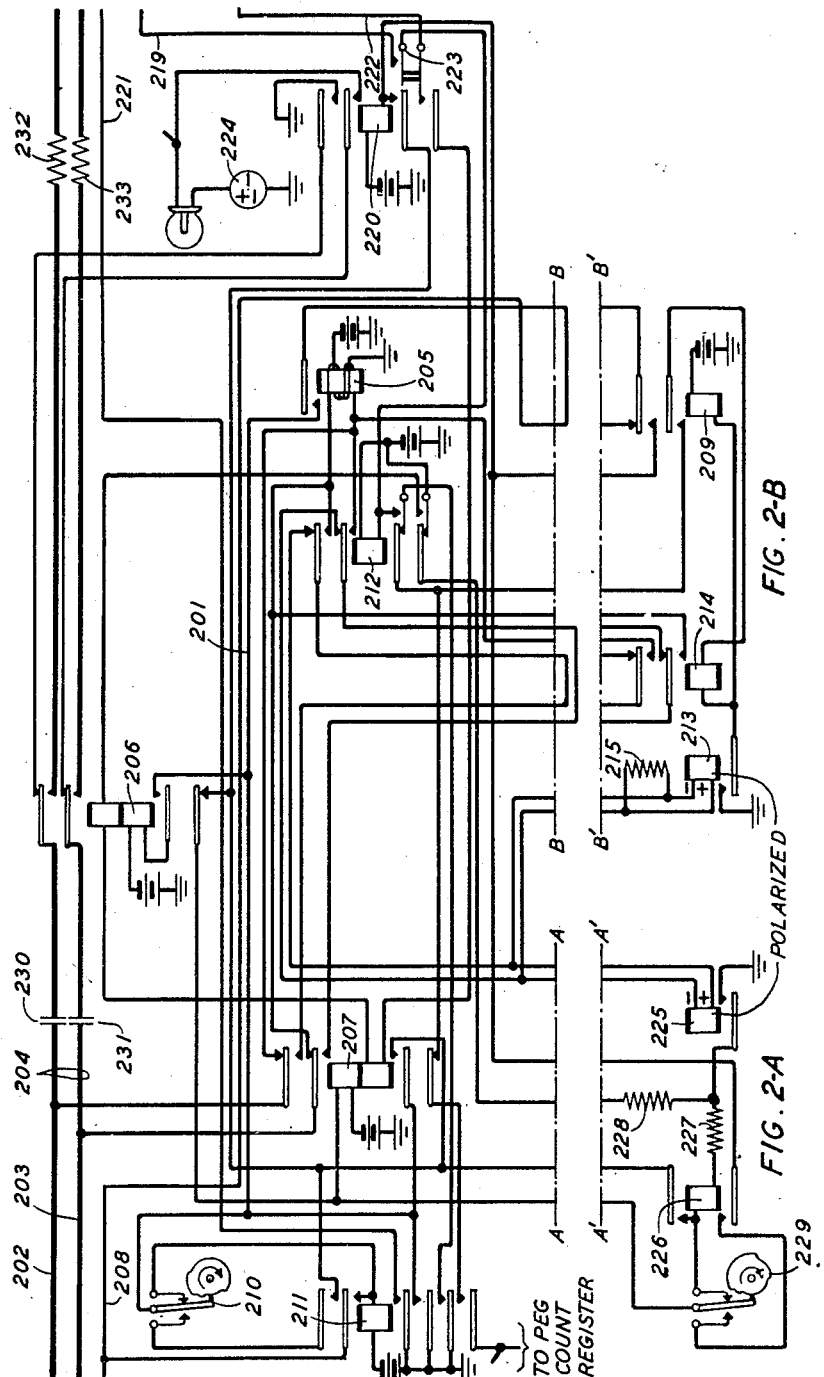

In the preceding description it was assumed that the sender of Fig. 1 was equipped to transmit a final heavy positive impulse of current and that consequently Fig. 2B was connected to Fig. 2. It will now be assumed that the sender does not transmit a final impulse of heavy positive current. In that case Fig. 2B will not be connected to Fig. 2 but Fig. 2A will be connected by joining the conductors extending downwardly from Fig. 2 to the line A—A; with the conductors extending upwardly from Fig. 2A to the line A'—A'. The conductors looped below line B—B will also be employed. When the trunk 204 is seized relays 205, 211 and 207 operate in the manner previously described and relay 207 upon operating disconnects the winding of relay 205 from the fundamental circuit extending to the sender and connects the winding of polarized relay 225 in series with the winding of relay 130 in the sender. Relay 225 does not operate in this circuit, but relay 130 operates and prepares the circuit of the sender for transmitting code impulses in the manner previously described. When the impulser switch 100 returns to position 1 after completing the transmission of the code impulses and advances switch 114 from position 9 to position 10 no heavy positive impulse of current will be transmitted as in this case the cam cuttings for connecting battery and ground to the control circuit as sequence switch 114 passes through position 9½ will be omitted from cams 126 and 138.

When switch 100 advances, transmitting the usual negative impulses of current, the polarized relay 225 will respond to each such negative impulse. When relay 207 operated it closed a circuit for relay 226 extending from battery over the lowermost normal contacts of relay 212, resistances 228 and 227, winding of relay 226, right contacts of interrupter 229, lower back contacts of relay 206, inner lower front contact of relay 207 to ground at a front contact of relay 211. Relay 226 locks over its upper front contact and the inner lower front contact of relay 207 to ground but is not effective to cause the operation of relay 220 during the transmission of code impulses because before interrupter 229 advances to close its left contact to complete the circuit of relay 220 over the lower contacts of relay 226, polarized relay 225 will respond to a negative code impulse and shunt relay 226 to cause its release. Thus during the transmission of the code impulses relay 225 in responding to each negative impulse will shunt relay 226 and since these negative impulses arrive periodically at intervals less than the interval required for interrupter 229 to complete a cycle, relay 226 cannot establish the circuit of relay 220.

Upon the completion of the transmission of the code impulses however, relay 225 will receive no more negative impulses and will remain deenergized thereby permitting relay 226 to reenergize and remain operated during a complete cycle of interrupter 229, whereupon the circuit of relay 220 will be closed from battery through the winding of relay 220, lower front contact of relay 226, left contacts of interrupter 229, lower back contact of relay 206, inner lower front contact of relay 207 to ground at a contact of relay 211. Relay 220 will therefore operate and perform the functions previously described, that is, will connect ringing tone from the source 224 to the calling line and will extend conductors 219 and 222 to relay 212 and to relays 207 and 206 respectively.

It will be recalled that when the trunk 204 was first seized, relay 211 operated and connected ground to start conductor 221. A start circuit was thus closed from ground on start conductor 221, normal contacts 301 of switch 350, back contact of relay 302 to battery through the winding of start relay 303 at the local distributing center. Relay 303 operates and connects the polarized relays 304 to 307 inclusive to the conductors of trunk 500 in series with the windings of relays 501 and 502 at the outgoing distributing point. The circuit thus established may be traced from battery through the lower windings of relays 501 and 502, the lower back contact of relay 503, the lower left winding of repeating coil 504, lower contacts of jack 521, conductor 505 of trunk 500, contacts 308 of switch 350, lower right winding of repeating coil 309, upper contact of relay 303, windings of relays 304 to 307 inclusive, upper right winding of coil 309, contacts 310 of switch 350, conductor 506 of trunk 500, upper contacts of jack 521, upper left winding of repeating coil 504, upper back contact of relay 503 to ground through the upper windings of relays 502 and 501. Relays 304 and 307 are so polarized that they operate in this circuit but relays 305 and 306 being oppositely polarized, do not operate. Relays 501 and 502 also operate to perform functions to be described hereinafter. Relays 304 and 307 upon operating establish obvious circuits for relays 311, 312 and 313. It is to be noted in this connection that the start conductor 221 is multipled to all trunks such as 204 extending from the several offices having access to the local distributing center disclosed in Figs. 3 and 4, so that when any subscriber in such offices initiates a call for time of day service, the start relay 303 will be operated.

Relay 311 upon operating closes obvious circuits for relays 314 and 315. Relays 312 and 313 also close circuits for other relays similar to relays 314 and 315. Since it is possible to operate four relays similar to relays 314 and 315 over each grounded contact of relays 311, 312 and 313, it is possible to thus operate twenty relays, and since each relay such as 315 is capable when operated of connecting ground to five conductors such as 219, the operation of polarized relays 304 and 307 may thus control the grounding of one hundred conductors 219 of one hundred trunks 204. When conductor 219 of trunk 204 is grounded through the operation of relay 315, the circuit of pick-up relay 212 is completed and relay 212 operates and locks from battery through its winding and inner lower alternate contacts to ground at the next to lower front contact of relay 211. At its lowermost normal contacts, relay 212 opens the circuit of relay 226, if Fig. 2A is furnished, at its lower normal contacts opens the locking circuits of relays 209 and 214 if Fig. 2B is furnished and at its lower alternate contacts prepares a circuit for relay 206 which will be described later. With relay 212 operated and relay 214 released battery and ground are connected to trunk 204 through the windings of relay 205 in such a manner as to cause polarized relay 122 to operate for call charging purposes. Similarly, the pick-up relay 212 of all trunks which have been seized for use by other subscribers in offices connected to the local distributing center are simultaneously operated through the operation of relays 314, 315 etc.

Operation of line in trouble alarm

Should the trunk circuit 500 be in trouble so that when the start relay 303 connects the relays 304 to 307 inclusive thereto, relays 304 and 307 do not operate and consequently relay 311 does not operate, a circuit is established for operating slow to operate relay 316 extending from battery, winding of relay 316, lower contact of relay 303, back contact of relay 311, back contact of relay 317 to ground. Relay 316 operates, causing slow to operate relay 318 and relays 319 and 320 to operate in turn. Relay 319 connects holding ground to the winding of start relay 303 to hold it operated until the trouble condition is removed, and relay 320 grounds conductors extending to the alarm board shown diagrammatically by the rectangle 321. This alarm device may comprise suitable lamps or signal devices for indicating to a maintenance man that a trouble condition exists on the trunk line.

In response to the alarm signals, the maintenance man depresses the key 322, thus releasing relay 320 which opens the circuit of the alarm signals and establishes over the upper contact of key 322 a circuit for a guard lamp (not shown) on the alarm board 321. When the trouble condition is removed, relay 316 releases, in turn releasing relays 318 and 319. Relay 320 reoperates from ground at the back contact of relay 318 over the lower alternate contacts of key 322, causing the alarm signals to be reoperated. Since the guard lamp is at this time lighted, the reoperation of the alarm signals indicates to the maintenance man that the trouble has been cleared, whereupon he releases key 322 extinguishing the guard lamp and releasing relay 320.

*Extension of start circuit to central bureau*

It will now be assumed that the operator is on duty at the central bureau and has plugged her announcing transmitter 601 and headset 602 by plugs 603, 604 and 605 into jacks 606, 607 and 608 of the desk circuit 600 and that consequently relays 609 and 610 are operated, relay 609 being operated over the make spring of jack 606 and relay 610 being operated in a circuit from battery through the upper winding of relay 610, sleeves of jack 606 and plug 603, transmitter 601, tips of plug 603 and jack 606, right windings of repeating coil 611 to ground through the lower winding of relay 610. Relay 610 in turn closes an obvious circuit for relay 612 which in turn closes an obvious circuit for relay 613. Relay 612 upon operating establishes the filament circuit for the repeater 675 extending from battery at the repeater, conductor 667, lower contact of relay 612, conductor 663, filaments of the vacuum tubes of repeater 675 to ground for lighting the filaments in the manner set forth in the application of R. F. Massonneau above referred to.

Relay 613 upon operating closes an obvious circuit for relay 614, prepares at its lowermost contacts a circuit for repeater alarm device 676 and closes a break in the start conductor 507 at its upper contacts. If the vacuum tubes of repeater 675 have energized properly and cause the flow of space current, the alarm circuit prepared by relay 613 will not therefore be closed through the operation of relay 613. Relay 614 upon operating closes an obvious circuit for relay 615 and a circuit for relay 617 extending from battery, winding of relay 617, back contact of relay 616 to ground at the upper contacts of relay 614. At its inner lower front contact, relay 615 connects battery to the filaments of the volume indicator 618 which may be of the type disclosed in Patent No. 1,523,827 granted January 20, 1925 to E. L. Nelson, and at its lower contacts closes the filament circuit of the vacuum tubes 801 and 802 of the oscillator circuit 800. This filament circuit may be traced from the filament battery through resistance 803, the filaments of the tubes in series, resistances 804 and 805, conductor 806, contacts of relay 615, conductor 807 to the other terminal of the filament battery.

When relays 501 and 502 at the outgoing distributing point, Fig. 5, operate as previously described, a start circuit is established from ground at the contacts of these relays over conductor 507 which is multiplied to other start conductors controlled by similar relays 501 and 502 in trunks similar to trunk 500 extending from other local distributing centers, such as is shown in Figs. 3 and 4, upper front contact of relay 613, back contact of relay 619 to battery through the winding of relay 620. Relay 620 which is slow to operate in turn establishes an obvious circuit for slow operating relay 621 which in turn operates and connects the winding of relay 622 to the start conductor 507. Relay 622 which is slow to release, in turn closes an obvious circuit for relay 623. Relay 623 connects the start conductor 507 directly to the winding of relay 622, closes an obvious circuit for relay 619 and an obvious circuit for call lamp 624. Lamp 624 lights as a signal to the operator that a call for time of day has been initiated by a calling subscriber. When relay 619 operates it opens the circuit of relay 620 which releases, in turn releasing relay 621. Relay 621 in turn opens the initial operating circuit of relay 622, but relay 622 is now held operated over the upper contacts of relay 623 so that relays 623 and 622 remain operated so long as there is a ground on start conductor 507, indicating that a demand exists somewhere in the area for time of day service. The purpose of the slow to operate relays 620 and 621 is to prevent a false signal from being given by reason of a momentary operation of relays 501 and 502 which might be caused due to line surges when disconnection takes place. The slow to release relay 622 is used to hold relay 623 operated over the period when relays 501 and 502 momentarily release when battery and ground are reversed through their windings as will be hereinafter described.

When relay 619 operates, it establishes a circuit from ground over its upper contact, conductor 626, the normal contacts of relay 700 to battery through the winding of relay 701. Relay 701 upon operating prepares a holding circuit for itself and establishes a circuit for relay 702 extending from battery, winding of relay 702, back contact of relay 703, upper back contact of relay 704 to ground the lower contact of relay 701. The operation of relay 702 connects ground to conductors 705 and 706 which extend through back contacts of relay 627 to conductors 628 and 629 extending to the outgoing distributing point and conductor 628 extending thence through the windings of relays 508 to 511 inclusive in parallel to battery. Conductor 628 may also extend through the windings of a second group of four similar relays if the area is large enough to require more trunks outgoing from the central bureau than can be served by the four relays 508 to 511 inclusive. Conductor 629 in a similar manner may be extended through the windings of four or eight additional relays similar to relays 508 to 511 inclusive. It will be noted that relays such as 508 and 510 each serve five outgoing trunks such as 500, and consequently as many as forty trunks may be served, although it is intended that not more than thirty-six working trunks shall be connected at one time to the desk circuit of Fig. 6, the remaining four trunks being held in reserve for emergency purposes.

Transmission of cut-through supervisory signal

When ground is connected to conductor 628 and relay 508 operates, it establishes a circuit for relay 503 extending from battery, upper winding of relay 503, lower contacts of key 512, inner back contact of relay 513 to ground at the inner front contact of relay 508. Relay 503 upon operating in turn extends operating ground from the front contact of relay 508 over the front contact of relay 503 to battery through the winding of relay 517. Relay 517 upon operating establishes a holding circuit from ground at its lower contact through the lower winding of relay 503. When relay 503 operates, it disconnects the upper windings of relays 501 and 502 and ground from trunk conductor 506 and the lower windings of relays 501 and 502 and battery from trunk conductor 505, and when relay 517 operates, the upper winding of relays 501 and 502 and ground are reconnected to trunk conductor 505 and the lower windings of these relays and battery are reconnected to trunk conductor 506, thus reversing the direction of current flowing over the conductors of trunk 500. In a similar manner relays 508 to 511 inclusive and other relays connected to conductors 628 and 629 cause a current reversal on other trunks similar to trunk 500.

The reversal of current flowing over trunk 500 now causes the release of polarized relays 304 and 307 and the operation of polarized relays 305 and 306. Relays 304 and 307 upon releasing in turn release relays 311, 312 and 313 which in turn release all relays 314 and 315 which have been operated. Relays 305 and 306 upon operating close obvious circuits for relays 317, 323 and 324. Relays 317 upon operating closes obvious circuits for relays 325 and 326 and relays 323 and 324 also close circuits for other relays similar to relays 325 and 326. Since it is possible to operate four relays similar to relays 325 and 326 over each grounded contact of relays 317, 323 and 324, it is thus possible to operate twenty relays, and since each relay such as 326 is capable when operated of connecting ground to five conductors such as 222, the operation of polarized relays 305 and 306 may thus control the grounding of one hundred conductors 222 of one hundred trunks 204.

When relay 326 operates to connect ground to conductor 222 with relays 212 and 220 operated as previously described, a connection is extended from ground on conductor 222 through the lower front contacts of relay 220, lower winding of relay 207, upper winding of relay 206 and lower alternate contacts of relay 212 to battery. Cut-through relay 206 operates and locks over its lower winding and lower front contact to ground at a contact of relay 211, disconnects the source of tone current 224 from the calling line and opens at its lower back contact the locking circuit of relay 207. Relay 207 however is held operated in series with relay 206. The operation of relay 206 also closes the talking conductors of trunk 204 through condensers 230 and 231 and resistances 232 and 233 to trunk 300 of the transmission network, thus bridging the calling line A on in parallel with other subscribers who are receiving service at the same time. The calling subscriber can now hear the announcement but disturbances or cross-talk between his line and the network are very largely prevented by condensers 230 and 231 and resistances 232 and 233.

Operation of clock circuit

Returning now to the operations which take place at the central bureau, it will be recalled that relay 702 operated to transmit supervisory impulses for causing all connected subscribers' lines which have initiated calls for time of day service to be cut through to the transmission network. A further consideration of the clock circuit disclosed in Fig. 7 will now be had. The central bureau is provided with a master clock disclosed in the dot and dash rectangle 707 which is synchronized by a district master clock every hour. Impulses sent out by the district master clock operate relay 708 which connects battery to the synchronizing magnet 709, thus keeping the master clock 707 in synchronism with the district master clock. The winding contacts 710 of the master clock are arranged to close every sixty minutes and to remain closed from six to seven seconds to cause the intermittent operation of the winding magnet 711. The magnet may also be operated independently by the winding key 712.

The master clock 707 is arranged to close a circuit for relay 713 through normal contacts of jack 714 switch 715, clock contacts 716 to ground. Contacts 716 close for a period of 0.5 of a second every 7½ seconds and thus operate relay 713 for 0.5 of a second every 7½ seconds. On the even hour or fifteen minutes past the hour, depending on whether the correction of the clock from the district clock is made on the even hour or fifteen minutes past the hour, the contacts 717 close and the contacts 716 are lifted off the operating cam of the clock, the relay 713 at that time operating over the hour contacts 717. Each time that relay 713 operates, it closes a circuit over the right normal contact of key 718 through the winding of magnet 719 of the electric position clock 720.

When the time indicated by the position clock 720 does not agree with the time indicated by the master clock 707 it may be reset by the operation of key 718 to its right or stop position or to its left or step position as required. If the position clock is behind the master clock, by operating the key to the step position in which position it does not lock, the clock maget 719 will be given an additional impulse over a circuit extending through the magnet winding, right normal contact of key 718 to ground over the left alternate contact of key 718 to advance the clock 7½ seconds. As many operations of key 718 to the left may be made as may be required to properly synchronize the clock 720 with the master clock 707. If the position clock is ahead of the master clock, the key 718 may be operated to its right or locking position, thereby stopping the advance of the position clock until it indicates the correct time. This clock 720 should read 7½ seconds faster than the master clock. It is the form of a veedometer and is graduated in minutes, quarter-minutes, and hours. When the time is 7½ seconds past the even minute, the fractional minute wheel of clock 720 should read one-quarter, and when it is fifteen seconds past the minute there should be no indication on the fractional minute wheel. The same applies for the one-half, three-quarters and even minute.

Each time that relay 713 operates from the master clock circuit in addition to advancing the position clock, it also closes a circuit extending from battery through resistance 721, winding of relay 722, lower normal contacts of relay 704 to ground at the upper contacts of relay 713, and from battery through resistance 723, winding of relay 724, normal contacts of relay 704 to ground at the upper contacts of relay 713. Relay 722 operates, but relay 724 does not, as it is at the time shunted over its lower back contacts by ground on the upper contact of relay 713. Relay 722 upon operating causes relay 704 to operate over a circuit extending through the winding of relay 704, front contact of relay 722 to ground at the back contact of relay 725. Relay 704 at its upper back contact opens the circuit of relay 702 which as will be recalled, was instrumental in causing current reversals at the outgoing distributing center for causing subscribers' lines to be cut through to the network. At its lower alternate contacts relay 704 establishes a holding circuit for relay 722 extending through the winding of relay 722, alternate contacts of relay 704 to ground at the back contact of relay 725.

After 0.5 of a second, relay 713 releases and opens at its upper contact, the shunt circuit around the winding of relay 724, whereupon relay 724 operates over the locking circuit of relay 722 and closes an obvious circuit for relay 700, which in turn closes an obvious circuit for relay 703 and closes a locking circuit for relay 701 extending over the upper contacts of relay 701 the upper alternate contacts of relay 700 to ground on the start conductor 626. Relay 703 upon operating closes an obvious circuit for relay 726, opens another point in the circuit of relay 702 and closes a circuit for announcing lamp 630, extending over conductor 631, the upper front contacts of relay 703, the upper front contacts of relay 704 to ground at the lower contact of relay 701. The lighting of lamp 630 is a signal to the operator that she should announce into her transmitter 601 the time indicated on the position clock 720. She may, for example, use the expression, "When you hear the tone signal it will be exactly 5¾ minutes after five o'clock." The transmission circuit by means of which the announcement is transmitted to calling subscribers connected to the network will be described hereinafter.

After approximately 7½ seconds, the contacts 716 again close and relay 713 operates, causing the clock 720 to advance 7½ seconds and closing a shunt around the winding of relay 722 extending from ground at the back contact of relay 725, alternate contacts of relay 704, winding of relay 722, lower front contacts of relay 724 to ground at the upper contact of relay 713. Relay 722 thereupon releases and closes a circuit for relay 727 extending through the winding of relay 727, lower front contact of relay 726, back contacts of relay 722, upper contacts of relay 701, upper alternate contacts of relay 700 to ground on conductor 626. Relay 722 also connects ground from conductor 626 over the inner front contact of relay 726, conductor 728 to battery through the winding of relay 632, thereby operating relay 632, and also opens the circuit of relay 704 which thereupon releases. The release of relay 704 opens the circuit of the announcement lamp 630.

With relays 727 and 632 operated, a tone circuit is established from the oscillator 800 to the talking conductors of the desk circuit 600 which may be traced from conductor 518, left normal contacts of key 650, upper front contacts of relays 617 and 632, conductor 633, upper contact of relay 727, left windings of repeating coil 729, lower contact of relay 727, conductor 634, lower alternate contacts of relay 632, lower contacts of relay 617, left normal contacts of key 650 to trunk conductor 520. From trunk conductors 518 and 520, this circuit is extended to the calling subscriber's line as will be hereinafter described. Tone current is induced from the oscillator circuit 800 through the right winding of repeating coil 729 over conductors 808 and 809. The operator is also enabled to hear this tone for checking purposes over a circuit extending from conductor 633, conductor 638, condenser 637, sleeves of jacks 607 and plug 604, headset receiver 602, sleeves of plug 605 and jack 608, condenser 636, conductor 635 and conductor 634.

When relay 713 releases when contacts 716 of clock 707 again open after 0.5 of a second, relay 724 which has been held operated over the lower normal contact of relay 704 and the upper contact of relay 713 releases in turn releasing relays 700, 703, 726, 727 and 632. Relay 701 will remain operated if a call still exists for time of day service, and with relays 704 and 703 released, will again close the circuit of relay 702 which will perform the function previously described of causing a cut-through of any subscribers' lines which may have initiated calls during the preceding 7½ seconds. The clock circuit thus functions to cause a cut-through signal to be sent out upon the network followed by the lighting of the announcement lamp 630 and then followed by the application of a tone signal from the oscillator 800 every fifteen seconds as long as there are existing calls. The cutting through of the trunks which have waiting calls occurs approximately 0.5 of a second before the announcement lamp 630 at the desk is lighted.

At the beginning of the announcement period, relay 700 is operated as previously described. In the event that there is no call waiting at this time, relay 701 will not be operated, and consequently ground will not be connected to light the announcement lamp 630. If a call waiting condition arises after relay 700 operates, ground is connected to conductor 626, but relay 701 cannot then operate as it is disconnected from conductor 626 at the uppermost contact of relay 700. After the announcement period, relay 700 releases as previously described, causing relay 702 to operate. At the beginning of the next 7½ seconds before the succeeding quarter of a minute, the lamp 630 will light as previously described. This arrangement insures that the announcement lamp will always be lighted at the beginning of the announcement period in order to give sufficient time to make a complete announcement. When there is no call waiting and therefore no ground on conductor 626, relays 713, 722, 724, 704, 700, 703 and 726 operate in the manner previously described, but relays 701, 702, 727 and 632 do not operate.

In order to have the clock circuit of Fig. 7 synchronized to indicate the start of the announcement period to the operator 7½ seconds before the quarter minute periods, it is necessary to operate relay 722 with relay 724 short-circuited. This condition may be obtained without disturbing the position clock 720, by operating the key 718 to the right and then releasing it to normal during the first half of any quarter of a minute as read on the second hand of the master clock 707 or during the period the second hand is passing over a white segment of the second hand dial. When key 718 is thus operated, relay 725 operates and removes the operating ground from relay 704. When the key is restored, relay 725 releases.

Operation of repeater at local distributing center

It will be assumed that the switch 350 at the local distributing center and key 650 at the desk circuit are all in their normal positions. With switch 350 normal, filament battery is connected to the filaments of the tubes or repeater 375 from battery at the repeater over conductor 349, normal contacts 327 of switch 350, conductor 343 through the tube filaments to ground in the manner disclosed in the application to R. F. Massonneau hereinbefore referred to. If the tubes are properly energized and emit space current a plate circuit relay (not shown) in the repeater will operate. If, however, the filaments do not light or the tubes do not emit space current, this relay will not operate, and a circuit is therefore closed from ground at the back contact of this relay over conductor 344, contacts 328 of switch 350, upper normal contacts of jack 329 to battery through the winding of slow to operate relay 330, and through resistance 333 and the inner normal contacts of jack 329 through the winding of slow to release relay 334. Relay 334 operates first and removes a short circuit from relay 335 extending from battery through the winding of relay 335, lower normal contacts of jack 329 to battery at the back contact of relay 334, thus permitting relay 335 to operate over the lower normal contacts of jack 329, resistance 336 to grounded conductor 344. Relay 335 upon operating opens the operating circuit of relay 332. When relay 330 operates it causes the operation of relay 331 which is also a slow to operate relay. As soon as relay 331 operates it closes a short circuit around the winding of slow to release relay 334 which after an interval releases, again short-circuiting relay 335 causing it to release. With relay 335 released and relay 331 operated, relay 332 operates and causes the operation of relay 302 and the closure of circuits for alarm signals on the alarm board 321. The operation of relay 302 opens the start circuit extending to the winding of relay 303, whereupon if calls come in to the local distributing center they will not be extended until the trouble condition is removed. Relay 302 also closes the circuit of a trouble lamp (not shown) on the repeater panel over conductor 346. The group of slow to operate and slow releasing relays 330, 331, 334 and 335, provides a sufficient delay before the operation of alarm signals to permit the tubes of the repeater 375 to become heated up when the repeater is placed into service.

If the trouble lamp lights, the maintenance man by throwing switch 350 to the right can remove the circuits of Fig. 3 from service. He then throws switch 450 of the alternate equipment, Fig. 4, to the left. A repeater similar to repeater 375 and supervisory and alarm equipment similar to that shown in Fig. 3 which is diagrammatically indicated in Fig. 4 by the rectangle 400, is then inserted between trunk 300 and trunk 500. In this connection it should be noted that switches 350 and 450 should not be operated in the same direction at one time. If both switches should through error be in the position in which switch 350 is shown, that is, thrown to the left, a circuit would be established from battery, winding of relay 337, contacts 438 of switch 450, conductor 339, contacts 338 of switch 350 to ground. Relay 337 will then operate closing alarm signals at the alarm board 321. Similarly if both switches 350 and 450 should be thrown to the right, the circuit of relay 337 will be completed from battery through the winding of relay 337, contacts 440 of switch 450, conductor 341, contacts 340 of switch 350 to ground. The maintenance man, noting the alarm signals will then throw the keys properly so that one, and only one, repeater circuit will be in service.

*Transmission of announcement of time*

Assuming that at the time the central bureau operator makes a time announcement in response to the lighting of announcement lamp 630, the repeater circuits of Figs. 3 and 6 are functioning properly and have been placed in service through the proper operation of switch 350 and key 650 as previously described, voice current will be transmitted from the announcing transmitter 601 over tips of plug 603 and jack 606, right windings of repeating coil 611, condenser 639, rings of jack 606 and plug 603 to the transmitter, the transmitter being supplied with current through the windings of relay 610. Induced current will then flow from the left windings of repeating coil 611, upper back contact of relay 640, upper back contact of relay 641, padding resistances 642 and 657, upper back contacts of relays 643 and 644, left windings of the input transformer of repeater 675, back contacts of relays 644 and 643, padding resistances 646, back contacts of relays 641 and 640 to the left windings of repeating coil 611. The induced current is then amplified in the well known manner by tubes of repeater 675 and impressed by the output transformer of the repeater upon a loop circuit over the lower normal contacts of relay 632, lower contact of relay 617, lower left normal contacts of key 650, conductor 520, lower normal contacts of key 512 through the right windings of repeating coil 504, upper normal contacts of key 512, conductor 518, upper normal contacts of key 650, upper contact of relay 617, and upper normal contact of relay 632.

Current is again impressed by repeating coil 504 upon a loop circuit extending from the upper left terminal of repeating coil 504, upper contacts of jack 521, trunk conductor 506, switch contacts 310, upper right winding of repeating coil 309, condenser 351, upper contact of relay 303, lower right winding of repeating coil 309, switch contacts 308, trunk conductor 505, lower contacts of jack 521, lower left winding of repeating coil 504, lower back contact of relay 503, condenser 522, upper back contact of relay 503, to the upper left winding of repeating coil 504. The current thus impressed on the right windings of repeating coil 309 is in turn impressed over the left windings of coil 309, and the windings of the input transformer of repeater 375. Repeater 375 amplifies the current thus impressed on the input transformer thereof and through the output transformer of this repeater impresses it over a loop circuit extending from the windings of the output transformer over conductor 347, switch contacts 342, resistance 232, upper contact of relay 206, condenser 230, conductor 202, tip brushes of selectors 145 and 102, right windings of repeating coil 144, thence over ring brushes of selectors 102 and 145, condenser 231, inner upper front contact of relay 206, resistance 233, switch contacts 345, conductor 348 to the windings of the output transformer of repeater 375. The calling subscriber on line A is enabled to hear the announcement made by the operator by current induced upon his line over the left windings of repeating coil 144.

At the same time, other subscribers' lines which may at the same time be connected to the network also receives the announcement over branches of the circuits above traced extending from conductors 518 and 520 at the outgoing distributing point, Fig. 5, and from conductors of trunk 300 at the local distributing center, Fig. 3.

After the announcement has been made by the central bureau operator and relay 632 has operated as previously described, a tone signal is applied over the network from the oscillator 800 of Fig. 8 in the manner just described for the transmission of voice current.

Immediately following the completion of the announcement period, current flowing over the loop supervisory circuits of the trunk network is again reversed by the clock circuit so that relay 326 at the local distributing center releases following the release of relay 702 at the clock circuit and opens the operating circuit of relays 206 and 207. Relay 206 remains locked but relay 207 releases. Relay 207 upon releasing reverses the direction of current flowing through supervisory relay 122 and releases relay 220. The purpose of reversing the current at this time is to prevent the calling subscriber from being charged for more than one call. The calling subscriber may now listen to more than one time announcement if he so desires.

*Restoration of connection*

When the calling subscriber hangs his receiver upon the switchhook, the district and office selectors 102 and 145 and line finder 101 release in the well known manner, the office selector removing ground at cam 143 from sleeve conductor 208 thereby releasing relay 211. Relay 211 in turn releases relays 212 and 206 and removes ground from start conductor 221. If there are no other calling subscribers' lines at the time connected to the local distributing center, start relay 303 thereat will release, thereby releasing relays 501 and 502 which in turn release opening start conductor 507. If there are no other calls at the time incoming to the outgoing distributing point, relays 622, 623 and 619 at the desk circuit will release to remove starting ground from conductor 626 and to extinguish the call waiting lamp 624.

*Alternate distributing circuits*

In the previous description it has been pointed out that repeater 375 at the local distributing center may, if defective, be removed from service by the operation of switch 350 and an alternate repeater 400 be placed into service by the operation of switch 450. A further safeguard against circuit failure is also provided at the outgoing distributing point whereby a group 523 of supervisory distributing relays, Fig. 5, may be cut out of service and a similar group of relays 527 substituted therefor. Reserve relays corresponding to relays 508 to 511 inclusive and 513 to 516 inclusive of group 523 are not disclosed in detail in Fig. 5 but have been indicated by the rectangle 527. If the maintenance man for example, should find it necessary to remove relays 508 to 511 inclusive, from service he will operate key 524, thus operating relays 513 to 516 inclusive, thereby rendering relays 508 to 511 ineffective to control reversing relays such as 503 of trunk 500 outgoing from the outgoing distributing point to local distributing centers. Key 524 when operated also establishes a circuit over conductor 526, the back contact of relay 647 to battery through the winding of relay 648. Relay 648 operates and lights out-of-service lamp 649 at the maintenance man's position and out-of-service lamp 651 at the operator's position. Relay 627 is also operated from ground on conductor 526 to open the reversing conductors 628 and 629, thus preventing any calls from being connected to the bureau while the operator is connected to the desk circuit 600 of Fig. 6.

The operator upon noting the lighted lamp 651, withdraws plugs 603, 604 and 605 from the jacks 606, 607 and 608 and connects these plugs with jacks 906, 907 and 908 of the emergency desk circuit shown diagrammatically by the rectangle 900 of Fig. 9. This causes relays 609 and 610 of the vacated desk circuit to release, relay 610 causing relay 612 to release to open the filament circuit of the associated repeater 675 and to release relay 613. Relay 613 upon releasing, releases relay 614, opens the alarm conductor extending from repeater 675 to the alarm circuit 676 and causes relays 622, 623 and 619 to release in turn. The release of relay 614 opens the circuits of relays 617 and 615 which also release. The release of relay 615 opens the filament circuits of the volume indicator 618 and of the oscillator 800. With the release of relay 623, the calling lamp 624 is extinguished and starting ground is removed from conductor 626 extending to the clock circuit of Fig. 7. When the operator plugs into the jacks 906, 907 and 908 of the alternate desk circuit 900, this desk circuit including an associated clock circuit, repeater circuit, oscillator and volume indicator, and repeater alarm circuit, function as previously described in connection with Figs. 6 to 8 inclusive.

The maintenance man upon observing the out-of-service lamp 649 lighted, operates key 650 to the left, thus disconnecting the talking conductors of the desk circuit 600 from the trunk conductors 518 and 520. With key 650 thrown to the left, obvious circuits are closed for relay 647 and relay 653 causing these relays to operate. Relay 647 opens the circuit of relay 648, thereby extinguishing lamps 649 and 651. The maintenance man then operates key 950 to the right, connecting the trunk conductors 518 and 520 to the desk circuit 900. Incoming calls are now directed to the desk circuit 900 in the same manner as previously described in connection with desk circuit 600. In a similar manner, if desk circuit 900 is in service with the distributing relay set 527 and trouble arises in the relay set, the key 525 would be operated, performing functions similar to key 524.

*Alternate desk and associated circuits*

In the event that trouble should be encountered in the repeater 675 associated with desk circuit 600 and it fails to emit space current when connected into service and the plate circuit relay of repeater 675 does not operate, a circuit is established from ground at the back contact of this relay, conductor 664, lower contact of relay 613, to relays in the alarm circuit 676 in the manner described in the application of R. F. Massonneau hereinbefore referred to. After a predetermined interval, if the trouble condition continues in the repeater 675, alarm signals are operated, a circuit is established over conductor 665 for lighting a trouble lamp on the repeater panel, and ground is connected to conductor 666 for operating relays 627 and 648 at the associated desk circuit 600.

At the desk circuit 600 upon the operation of relay 627, the supervisory reversing conductors 628 and 629 are opened to prevent any subscribers' lines from being cut through to the central bureau, and upon the operation of relay 648, the out-of-service lamp 651 is lighted at the operator's position to inform her that she should transfer to the desk circuit 900 and out-of-service lamp 649 is lighted at the maintenance man's position. The maintenance man upon observing the lighted lamp 649 operates key 650 to the left, thus disconnecting the talking conductors of desk circuit 600 from the trunk conductors 518 and 520 and connecting this desk circuit with his test line 652 and operates key 950 to the right, to connect the trunk line with the desk circuit 900.

With key 650 thrown to the left, obvious circuits are closed for relays 647 and 653, causing these relays to operate. Relay 647 opens the circuit of relay 648, thereby extinguishing lamps 649 and 651 and closes an obvious circuit for relay 654 which in turn closes an obvious circuit for relay 616. Relay 616 locks over the upper contact of relay 654 to ground at the lower right contact of key 650. Relay 616 upon operating opens the circuit of relay 617 at one point, this circuit being further opened at the contact of relay 614 as soon as the operator disconnects from the desk circuit 600. Relay 617, however, reoperates over an obvious circuit closed by relay 653, thus connecting the talking conductors of the desk circuit over its front contacts and the left contacts of key 650 to the test line 652 for testing purposes. Relay 653 also closes a circuit extending from ground at its lower front contact over the upper front contact of relay 647 to battery through the winding of relay 648 for reoperating relay 648 to relight lamps 649 and 651, these lamps now remaining lighted until the key 650 is restored.

The maintenance man may now test the vacated channel under operating conditions by having a spare transmitter plugged into jack 606 and a receiver connected to the test line 652. With the spare transmitter plugged up, relays 609, 610, 612, 613, 614, 615, 620, 621, 622, 623, 619 and 632 function as previously described, and the maintenance man will be able to hear regular announcements made by the operator through the spare transmitter and also receive tones from the oscillator 800.

After the maintenance man has repaired the trouble he will restore the key 650 to normal. When key 650 is restored, relay 653 releases, but relay 647 is held operated over a circuit extending over the upper contacts of relay 654 to ground at the upper contact of relay 614. Relay 647 holds relays 654 and 627 operated. When relay 653 releases, relay 617 releases, since at this time relay 616 is operated and at its lower back contact connects interrupted ground from interrupter 655 over the upper front contact of relay 647 through the winding of relay 648. Relay 648 is now intermittently operated to flash out-of service lamps 649 and 651. The operator noting the flashing of lamp 651 will disconnect the spare transmitter from jack 603, thus releasing relays 609 and 610, which in turn cause the release of relays 612, 613, 614, 615, 622, 623 and 619. Relay 614 upon releasing releases relay 647 which in turn releases relay 648, and extinguishes lamps 649 and 651 and releases relays 654 and 616. The extinguishing of lamp 651 is a signal to the operator that the associated channel is operative. The desk circuit of Fig. 9 may in a similar manner be removed from service and connected to test line 952 for testing purposes.

*Desk circuit alarm*

Should the desk circuits be both vacated and a call be incoming, ground on conductor 507 is extended over the normal contacts of jacks 607 and 608, conductor 656, normal contacts of jacks 907 and 908 to the winding of relay 957. Relay 957 operates, closing a circuit for audible signal 958. Should the transmitter plug 603 be inserted in jack 606 of desk circuit 600 and the receiver plugs 604 and 605 be inserted in jacks 907 and 908 of desk circuit 900 or vice versa and a call be incoming, ground or conductor 507 is extended over normal contacts of jacks 907 and 908, and conductor 656, back contact of relay 909 to battery through the winding of relay 957, thus operating the audible signal 958. It is to be noted that if the transmitter plug 603 and receiver plugs 604 and 605 are inserted into the jacks of the same desk circuit, that no circuit is possible for relay 957.

*Transmission circuit padding*

In the previous description, reference was made to the padding resistances 642 and 646 in the operator's transmission circuit. Padding resistances are provided for the purpose of controlling the volume of transmission from the operator's transmitter 601 in accordance with the strength of operators' voices. When an operator who has a voice of average strength is making the announcement, the volume control key 661 is in the normal position and the volume padding resistances 642, 646 and 657 are effective as previously described. If, however, an operator has a weak voice, the key 661 is operated to the left thus operating relays 640 and 644 to remove the padding resistances altogether. If the operator has a voice strength greater than the average, key 661 is operated to the right, thus operating relays 641 and 643 to substitute padding resistances 658, 659 and 660 for resistances 642, 646 and 647. The reading of the volume indicator galvanometer 662 is used in determining the proper position of the volume control key 661 for different operators who may announce the time of day.

What is claimed is:

1. In a telephone system, a calling line, a trunk circuit, a selector switch, a register sender, means controlled from said calling line for registering in said sender the office and numerical designations of wanted lines, means controlled by said sender in accordance with the office designation registered for setting said switch to select said trunk circuit, means in said sender for transmitting codes of impulses to said trunk circuit in accordance with the numerical designation registered, means in said trunk circuit for absorbing code impulses, and means for preparing signal circuits at said trunk circuit upon the receipt of the last impulse of the code impulses transmitted thereto.

2. In a telephone system, a calling line, a trunk circuit, a selector switch, a register sender, means controlled from said calling line for registering in said sender the office and numerical designations of wanted lines, means controlled by said sender in accordance with the office designation registered for setting said switch to select said trunk circuit, means in said sender for transmitting codes of impulses comprising negative and positive impulses to said trunk circuit in accordance with the numerical designation registered, means in said trunk circuit for absorbing said code impulses, and means in said trunk circuit operative a predetermined interval following the last impulse of negative potential transmitted to prepare signaling circuits.

3. In a telephone system, a calling line, a trunk circuit, a selector switch, a register sender, means controlled from said calling line for registering in said sender the office and numerical designations of wanted lines, means controlled by said sender in accordance with the office designation registered for setting said switch to select said trunk circuit, means in said sender for transmitting codes of impulses comprising negative and positive impulses to said trunk circuit in accordance with the numerical designation registered, a polarized relay in said trunk circuit responsive only to said negative impulses, a second relay and an interrupter, and means controlled by said second relay and interrupter for preparing signaling circuits in said trunk circuit a predetermined interval following the response of said polarized relay to the last negative impulse transmitted.

4. In a telephone system, a calling line, a trunk circuit, a selector switch, a register sender, means controlled from said calling line for registering in said sender the office and numerical designations of wanted lines, means controlled by said sender in accordance with the office designation registered for setting said switch to select said trunk circuit, means in said sender for transmitting codes of impulses comprising positive and periodically occurring negative impulses to said trunk circuit in accordance with the numerical designation registered, a first relay in said trunk circuit, an interrupter having front and back contacts, a circuit for operating said relay upon each closure of the front contacts of said interrupter following the seizure of said trunk circuit, a polarized relay in said trunk circuit responsive only to each negative impulse transmitted thereto from said sender, a shunt circuit for said first relay controlled by said polarized relay effective to shunt down said first relay during the period elapsing between the closure of the front contacts and the closure of the back contacts of said interrupter, and means controlled over the back contacts of said interrupter and contacts of said first relay for preparing signaling circuits upon the release of said polarized relay following the receipt of the last negative impulse of the code of impulses transmitted by said sender.

5. In a telephone system, a calling line, a trunk circuit, a selector switch, a register sender, means controlled from said calling line for registering in said sender the office and numerical designations of wanted lines, means controlled by said sender in accordance with the office designation registered for setting said switch to select said trunk circuit, means in said sender for transmitting codes of impulses comprising negative and positive impulses and terminating with a positive impulse of increased current strength in accordance with the numerical designation registered, means in said trunk circuit for absorbing said code impulses, and means in said trunk circuit responsive to the final positive impulse preparing signaling circuits.

6. In a telephone system, a calling line, a trunk circuit, a selector switch, a register sender, means controlled from said calling line for registering in said sender the office and numerical designations of wanted lines, means controlled by said sender in accordance with the office designation registered for setting said switch to select said trunk circuit, means in said sender for transmitting codes of impulses comprising negative and positive impulses and terminating with a positive impulse of increased current strength in accordance with the numerical designation registered, a polarized relay in said trunk circuit responsive only to said positive impulse of increased current strength, time measuring relays controlled by said polarized relay, and means controlled by said time measuring relays for preparing signaling circuits.

7. In a telephone system, a calling line, a central bureau, a trunk circuit extending to said bureau, signaling circuits in said trunk circuit under the control of said central bureau, a selector switch, a register sender, means controlled from said calling line for registering in said sender the office and numerical designations of said central bureau, means controlled by said sender in accordance with the office designation registered for setting said switch to select said trunk circuit, means in said sender for transmitting codes of impulses to said trunk circuit in accordance with the numerical designation registered, means in said trunk circuit for absorbing said code impulses, and means in said trunk circuit following the last impulse of the code impulses transmitted thereto for closing said signaling circuits at said trunk circuit.

8. In a telephone system, a central bureau having a telephone transmitter and a clock circuit, a local office having trunk circuits outgoing therefrom, a calling line, means for connecting said calling line with an idle outgoing trunk circuit, a trunk network for extending said trunk circuit to the central bureau, a supervisory circuit extending over said trunk network, means controlled by the seizure of said trunk circuit for establishing said supervisory circuit to establish a start circuit at said central bureau and to signal said trunk circuit that a connection has been established to said central bureau, and means controlled by said clock circuit for changing the condition of said supervisory circuit to cause said transmitter to become connected at said trunk circuit telephonically with said calling line.

9. In a telephone system, a central bureau having a telephone transmitter and a clock circuit, a local office having trunk circuits outgoing therefrom, a calling line, means for connecting said calling line with an idle outgoing trunk circuit, a trunk network for extending said trunk circuit to the central bureau, a supervisory circuit extending over said trunk network, means controlled by the seizure of said trunk circuit for establishing said supervisory circuit to close a start circuit at said central bureau, a relay in said trunk circuit operative responsive to the establishment of a connection to said central bureau, a second relay in said trunk circuit for closing the talking conductors of said trunk circuit to establish a telephonic circuit between said transmitter and said calling line, and means controlled by said clock circuit for changing the condition of said supervisory circuit to establish a circuit for said second relay over contacts of said first relay.

10. In a telephone system, a central bureau having a telephone transmitter and a clock circuit, a local office having trunk circuits outgoing therefrom, a calling line, a selector switch for connecting said calling line with an idle outgoing trunk circuit, a trunk network for extending said trunk circuit to the central bureau, a supervisory circuit extending over said trunk network, means controlled by the seizure of said trunk circuit for establishing said supervisory circuit to close a start circuit at said central bureau, a first relay in said trunk circuit operative responsive to the establishment of a connection to said central bureau, a call charging relay in said switch operative for call charging purposes upon the operation of said first relay, a second relay in said trunk circuit for closing the talking conductors of said trunk circuit to establish a telephonic circuit between said transmitter and said calling line, and means controlled by said clock circuit for changing the condition of said supervisory circuit to establish a circuit for said second relay over contacts of said first relay.

11. In a telephone system, a central bureau having a telephone transmitter and a clock circuit, a local office having trunk circuits outgoing therefrom, a calling line, means for connecting said calling line with an idle outgoing trunk circuit, a trunk network for extending said trunk circuit to the central bureau, a supervisory circuit extending over said trunk network comprising a line relay and a source of current at the central bureau end of said network and a pair of oppositely polarized relays at the office end of said network, means in said trunk circuit for closing said supervisory circuit upon the seizure of said trunk circuit to thereby operate said line relay and a first of said polarized relays, a start circuit at said bureau controlled by said line relay, a pick-up relay in said trunk circuit controlled by said first polarized relay, means at said central bureau under the control of said clock circuit for reversing the current in said supervisory circuit for thereby operating the second polarized relay, and means controlled by said second polarized relay and said pick-up relay for establishing a talking circuit from said transmitter to said calling line.

12. In a telephone system, a central bureau having a telephone transmitter and a clock circuit, a local office having trunk circuits outgoing therefrom, a calling line, means for connecting said calling line with an idle outgoing trunk circuit, a trunk network for extending said trunk circuit to the central bureau, a supervisory circuit extending over said trunk network comprising a line relay and source of current at the central bureau end of said network and a pair of oppositely polarized relays at the office end of said network, means in said trunk circuit for closing said supervisory circuit upon the seizure of said trunk circuit to thereby operate said line relay and said first polarized relay, a start circuit at said bureau controlled by said line relay, a pick-up relay in said trunk circuit controlled by said first polarized relay, means at said central bureau under the control of said clock circuit for reversing the current in said supervisory circuit for thereby operating the second polarized relay, and a cut-through relay controlled by said second polarized relay and said pick-up relay for establishing a talking circuit from said transmitter to said calling line.

13. In a telephone system, a central bureau having a telephone transmitter, a local office having trunk circuits outgoing therefrom, calling lines, means for connecting said calling lines with idle trunk circuits, a trunk network extending to said central bureau and multipled to said trunk circuits, a supervisory circuit extending over said trunk network comprising a line relay and source of current at the central bureau end of said network and a pair of oppositely polarized relays at the office end of said network, means in said trunk circuits for closing said supervisory circuit upon the seizure of said trunk circuits to thereby operate said line relay and a first of said polarized relays, a start circuit at said bureau controlled by said line relay, a pick-up relay in each of said trunk circuits controlled by said first polarized relay, means at said central bureau for reversing the current in said supervisory circuit for thereby operating said second polarized relay, and a cut-through relay in each of said trunk circuits controlled by said second polarized relay and the corresponding pick-up relays of said trunk circuits for concurrently establishing talking circuits from said transmitter to said calling lines.

14. In a telephone system, a central bureau having a telephone transmitter, local offices having trunk circuits outgoing therefrom, calling lines in each of said offices, means for connecting calling lines of an office to the trunk circuits outgoing therefrom, a trunk network extending to said central bureau and multipled to said trunk circuits, a supervisory circuit extending over said trunk network comprising a line relay and source of current at the central bureau end of said network and a pair of oppositely polarized relays at the office end of said network, means in said trunk circuits for closing said supervisory circuit upon the seizure of said trunk circuits to thereby operate said line relay and a first of said polarized relays, a start circuit at said bureau controlled by said line relay, a pick-up relay in each of said trunk circuits controlled by said first polarized relay, means at said central bureau for reversing the current in said supervisory circuit for thereby operating said second polarized relay, and a cut-through relay in each of said trunk circuits controlled by said second polarized relay and the corresponding pick-up relays of said trunk circuits for concurrently establishing talking circuits from said transmitter to said calling lines.

In witness whereof, we hereunto subscribe our names this 5th day of January, 1931.

CHARLES W. KECKLER.
ALFRED E. HAGUE.